Oct. 24, 1939.  J. A. ROSEMAN  2,177,189

MULTIPLE GANG MOWING MACHINE

Filed Aug. 19, 1937

Witness:
Chas. R. Koursh

Inventor
Joseph A. Roseman
Offield Towle Pratt & Poole, Attys.

Patented Oct. 24, 1939

2,177,189

UNITED STATES PATENT OFFICE 2,177,189

MULTIPLE GANG MOWING MACHINE

Joseph A. Roseman, Glenview, Ill.

Application August 19, 1937, Serial No. 159,937

4 Claims. (Cl. 56—7)

This invention relates to improvements in multiple gang mowing machines of the type used on golf links and large park areas, and more particularly to mowing machines including a wheeled hitch frame and a plurality of separate mower units connected thereto in trailing position.

The principal object of the invention is to provide a simple and improved construction of supporting mechanism for the front end of each of the mowing units, whereby said mower units are adjustably supported with respect to the ground by their respective trailing hitch means, thereby eliminating the use of auxiliary ground roller supports adjacent the front of the unit, as heretofore used for determining the normal cutting height of the mower units with respect to the ground.

Figure 1:
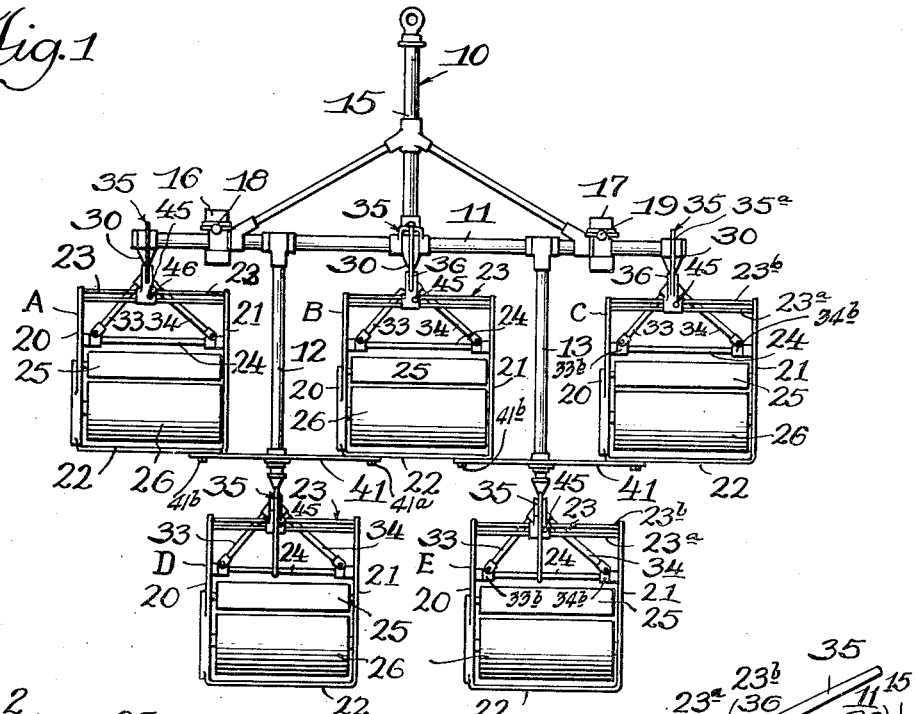
Figure 2:
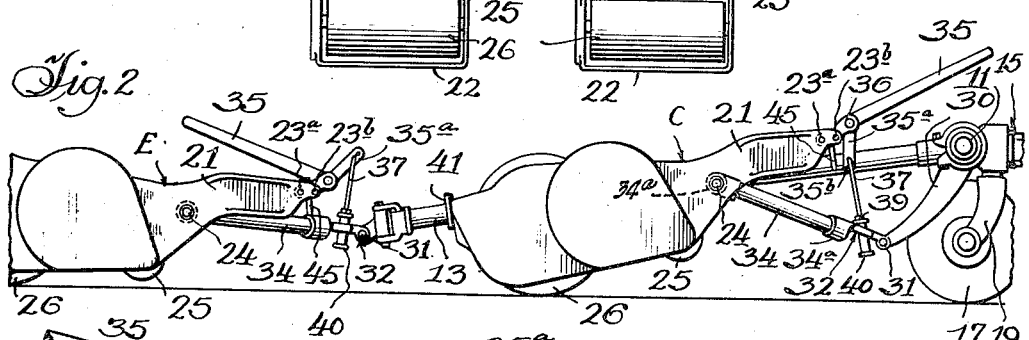
Figure 3:
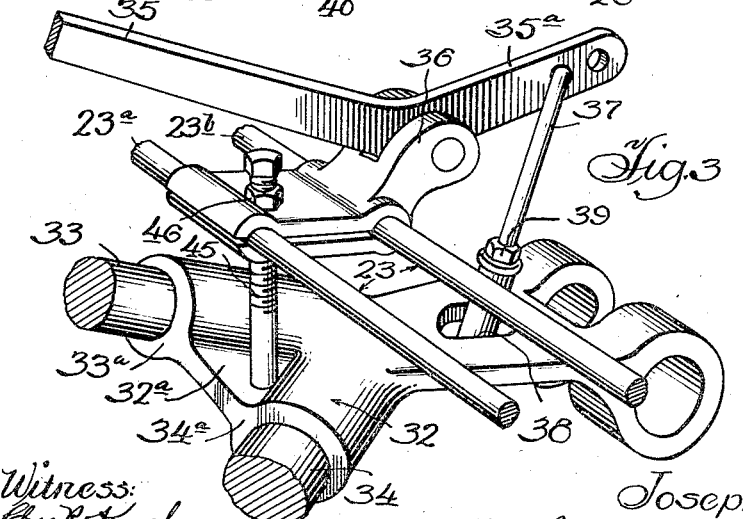

The invention may best be understood by reference to the accompanying drawing illustrating one embodiment thereof, in which Figure 1 is a plan view of a multiple gang hitch with five mower units connected thereto, in accordance with my invention;

Figure 2 is an enlarged side view of the multiple gang hitch shown in Figure 1 and illustrating the lift mechanism for the front mower unit in raised position, as for traveling or cutting at a higher level, and with the lift mechanism of the rear unit in lowered position as for normal cutting; and Figure 3 is an enlarged detail view showing the main parts of the lift mechanism and adjustable mower supporting means constituting the principal feature of my invention.

Referring now to details of the embodiment of my invention illustrated in the drawing, the main frame of the multiple gang hitch 10, as shown in Figure 1, is designed for use as a five-gang mower in which three mower units, indicated as A, B and C, are arranged in the front row in transverse alignment along the main gang bar 11, and are connected thereto by means hereinafter more fully described. Two trailer mower units D and E are arranged in a second row and are connected as will hereinafter more fully appear to rearwardly extending drag bars 12 and 13 pivotally connected to said main gang bar at their front ends for vertical swinging movement, and disposed respectively between the mower units A and B and B and C, so that said trailing mower units will cut the swath which otherwise would be left uncut in the space between adjacent front mower units. The five-gang hitch frame illustrated is of the same general type and construction previously used and includes a tongue 15 at the front end thereof adapted for connection to a tractor or similar draft means, and a pair of supporting rollers 16 and 17 of the caster type swively connected in vertically disposed brackets 18 and 19, respectively, adjacent the opposite ends of the main gang bar 11.

The mower units A, B, C, D, and E may be of any suitable construction usually employed with machines of this character, such as shown in my Patents Nos. 1,327,924 and 2,126,139 and need not be described in detail herein, excepting to point out the principal parts thereof, which are similar in each instance, and comprise a main frame including side bars 20 and 21, a rear cross-bar 22 and a front cross member indicated generally at 23. In the form shown in enlarged detail in Figure 3, it will be seen that the cross member consists of two bars 23ª and 23ᵇ, which, for convenience herein, will be referred to as a single cross member. A cutter reel 25 is rotatably mounted between the side frames 20 and 21, and a main drive roller 26 is disposed rearwardly of the cutter reel to form the main support for the mower unit. Suitable drive connections (not shown) are provided between the roller 26 and the cutter reel 25, as for instance by gearing carried on one of the side frames 20.

Referring now to the means for connecting the front mower units A, B and C to the gang bar 11, a bracket 30 is mounted on the gang bar and depends downwardly and rearwardly in front of each of the front mower units and is connected by a pivot pin 31 to a bracket 32. The bracket 32 has a pair of rearwardly diverging socket members 33ª and 34ª in which diverging draft arms 33 and 34 are connected at their front ends. The rear ends of the draft arms 33 and 34 are pivotally connected by sleeves 33ᵇ and 34ᵇ to an intermediate cross bar 24 of the mower unit, as shown in Figure 2, said intermediate cross bar extending between the side walls 20 and 21 at a point substantially to the rear of the front cross member 23.

The rear or trailing units D and E are connected to the hitch frame through a similar bracket 32 and diverging draft arms 33 and 34, except that in this case the bracket 32 is pivotally connected to the rear end of the trailing gang bars 12 and 13. However, the rear ends of said gang bars are each supported in fixed position with respect to the ground by passing through a tie bar 41 which is pivotally connected by bolts 41ª and 41ᵇ to the respective rear frame members 22, 22 of the adjacent pair of front mower units. The bolts 41ª and 41ᵇ passing loosely through enlarged holes in said tie bars are preferably loose so as to afford limited universal rocking movement between the several front mower units while following uneven ground. These tie bars 41 thus serve both to maintain the aforesaid front mower units in spaced relation with each other, and to support the rear end of their respective gang bars so as to form a reaction member for the lift and the supporting mechanism of the rear mowing units.

Manual means for lifting the front end of each of the mower units with respect to the ground is provided, as usual, to change the cutting height of the mowers to a uniformly higher level, as for cutting so-called "rough" or heavy grass. This lifting mechanism for each mower unit includes a hand-lever 35 pivoted on a bracket 36 rigidly mounted on the front cross member 23 and having an arm 35ª integral with said hand-lever, to which is connected a depending link 37 extending through an eye 38 formed in the central portion of the bracket 32. Said link 37 has a pair of stops 39 and 40 thereon spaced from each other so as to provide substantial vertical movement of the link 37 relative to the bracket 32. It will be observed in Figure 2 that the front mower unit C is shown with its lifting lever 35 thrown forwardly, whereas the rear mower unit E is shown in low cutting position with its lifting lever 35 thrown rearwardly. In ordinary operation it will, of course, be understood that all of the units will be disposed either in low cutting position or in elevated high cutting position.

Referring first to the arrangement of the lift mechanism shown in elevated position as with the front mower unit C, shown in Figure 2, it will be observed that forward movement of the lever 35 thrusts the link 37 downward until the upper stop 39 engages the connecting bracket 32. Further swinging movement of said lever causes the entire lift mechanism and the front cross bar 23 of the mower unit to be elevated relative to the intermediate cross bar 24 of said unit, and thus tilt the front end of the mower unit C upwardly into the position shown, in which the unit will ride upon its rear traction roller 26 but with the cutter reel 25 raised substantially from the ground. The lift lever 35 may be locked in raised position by a locking pin 35ᵇ removably inserted in the arm 35ª and engageable with the link 37 so as to hold the latter at a forwardly projecting angle, as shown in connection with the front mower unit C in Fig. 2.

Referring now more particularly to the means for adjustably supporting the front end of the mower unit in its lowered, normal cutting position, I provide an adjustable extension, herein consisting of a bolt 45, disposed between the front cross bar 23 and the bracket 32. In the form shown in detail in Figure 3, the bolt 45 is threaded vertically through the bracket 36 between the two cross bars 23ª and 23ᵇ, which together form the cross member 23 as previously described. It will be observed that when the lift mechanism is moved to lowered position, as shown in connection with the rear mower unit E in Figure 2, and also in enlarged detail in Figure 3, the control lever 35 is swung rearwardly so as to permit the front end of the mower unit to be lowered into low cutting position. This lowering action of the mower unit is limited by positive engagement of the bottom end of the bolt 45 with the bracket 32. In the form shown herein, a web 32ª is formed between the diverging socket members 33ª and 34ª to provide a convenient abutment for this purpose. With the parts arranged as shown in Figure 3, the front end of the mower unit will be positively supported by the bolt 45 at a definite cutting level, which level, however, is capable of vertical adjustment by means of the threaded bolt 45. A locking nut 46 may be threaded on the bolt 45 to maintain any desired position of adjustment.

When the front end of the mower unit is supported by the bolt 45, as above described, the use of auxiliary supporting rollers, such as previously employed at both sides of the mower units of this character, is rendered unnecessary. Instead, the entire front end of the mower unit is flexibly supported at a single point to permit lateral tilting thereof while following uneven ground.

In order to balance the mower units transversely, I find it desirable to locate the supporting bolt 45 substantially at a point where the suspended weight of the front end of the unit will be equally distributed. In cases where, as herein shown, the gearing for driving the main roller 26 is located at one side of the mower frame, the greater weight of the gearing is compensated for by locating the supporting bolt 45 and the cooperating bracket 32 slightly off center toward the heavier side of the frame, as clearly shown in Figure 1. Although in previous practice the draft means have been offset laterally to balance greater traction resistance produced on the geared side of the main tractor roller 26, I find, however, that a somewhat different degree of lateral offset of the bolt 45 is usually required to provide proper lateral balance for the front end of the mower unit, when supported on said bolt as described. The proper amount of lateral offset can, of course, be readily determined by experiment in each case.

From the above description, it will now be understood that the form of supporting and adjusting means consisting of a single adjustable bolt 45 or its equivalent, affords an extremely simple and improved construction for the purpose described. The cutting height of all of the units can be quickly and easily effected by a single adjustment of each bolt, instead of requiring double adjustment of the two auxiliary caster wheels previously used with each mower unit of this type.

Although I have illustrated and described certain embodiments of my invention, it will be understood that I do not wish to be limited to the exact construction shown and described, but that various changes and modifications may be made without departing from the spirit and scope of my invention as defined in the appended claims.

I claim as my invention:

1. In a multiple gang mower hitch and in combination with a frame including a wheel-supported gang bar, a mower unit having traction drive means adjacent the rear end thereof and a cutter reel disposed forwardly of said traction means, draft connections between said gang bar and said mower unit, including a rigid draft member pivotally connected to said mower unit intermediate the front and rear end of the latter, manually controlled lever means on the front of said mower unit cooperating with said rigid draft member and movable into position to elevate the front end of said mower unit with respect to the ground, and an abutment device adjacent the front end of said mower unit movable into supporting engagement with said rigid draft member when said manual lever means is in inoperative position, whereby the cutter reel is supported at a predetermined cutting level.

2. In a multiple gang mower hitch and in combination with a frame including a wheel-supported gang bar, a mower unit having traction drive means adjacent the rear end thereof and a cutter reel disposed forwardly of said traction means, draft connections between said gang bar and said mower unit including a rigid draft member pivotally connected to said mower unit intermediate the front and rear end of the latter, manually controlled lever means on the front of said mower unit cooperating with said rigid draft member and movable into position to elevate the front end of said mower unit with respect to the ground, and a vertically adjustable abutment device adjacent the front end of said mower unit movable into supporting engagement with said rigid draft member when said manual lever means is in inoperative position, whereby the cutter reel is supported at a predetermined cutting level.

3. In a multiple gang mower hitch and in combination with a frame including a wheel-supported gang bar, a mower unit having traction drive means adjacent the rear end thereof and a cutter reel disposed forwardly of said traction means, draft connections between said gang bar and said mower unit including a rigid draft member pivotally connected to said mower unit intermediate the front and rear end of the latter, manually controlled lever means on the front of said mower unit cooperating with said rigid draft member and movable into position to elevate the front end of said mower unit with respect to the ground, and a single abutment device adjacent the front end of said mower unit movable into supporting engagement with said rigid draft member at a fulcrum point substantially balancing the front end of said mower unit transversely thereof when said manual lever means is in inoperative position, whereby the cutter reel is supported at a predetermined cutting level.

4. In a multiple gang mower hitch and in combination with a frame including a wheel-supported gang bar, a mower unit having traction drive means adjacent the rear end thereof, and a cutter reel disposed forwardly of said traction means, draft connections between said gang bar and said mower unit including a rigid draft member pivotally connected to said mower unit intermediate the front and rear end of the latter, manually controlled lever means on the front of said mower unit cooperating with said rigid draft member and movable into position to elevate the front end of said mower unit with respect to the ground, and a single abutment device adjacent the front end of said mower unit movable into supporting engagement with said rigid draft member at a fulcrum point substantially balancing the front end of said mower unit transversely thereof when said manual lever means is in inoperative position, whereby the cutter reel is supported at a predetermined cutting level, and means for adjusting the vertical height of said abutment to vary the cutting level of said cutter reel.

JOSEPH A. ROSEMAN.